US011032335B1

(12) United States Patent
Knas et al.

(10) Patent No.: US 11,032,335 B1
(45) Date of Patent: Jun. 8, 2021

(54) CONCURRENT SECONDARY ELECTRONIC COMMUNICATION SESSION

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

(21) Appl. No.: 16/429,873

(22) Filed: Jun. 3, 2019

(51) Int. Cl.
H04L 29/06 (2006.01)
H04L 12/18 (2006.01)
H04M 3/56 (2006.01)

(52) U.S. Cl.
CPC ...... H04L 65/4015 (2013.01); H04L 12/1822 (2013.01); H04L 65/4053 (2013.01); H04M 3/56 (2013.01); H04M 3/564 (2013.01)

(58) Field of Classification Search
CPC . H04L 65/4015; H04L 65/4007; H04L 65/40; H04L 65/4023; H04L 65/403; H04L 65/4038; H04L 65/4053; H04L 12/1822; H04L 12/1813; H04L 12/18; H04L 12/16; H04L 12/02; H04L 12/00; H04M 3/42; H04M 3/56; H04M 3/564
USPC ........................................................ 709/204
See application file for complete search history.

(56) References Cited

U.S. PATENT DOCUMENTS 6,404,873 B1 * 6/2002 Beyda ................. H04L 12/1813 379/202.01
7,634,074 B2 * 12/2009 Coulas ................ H04L 12/1813 370/261
8,326,927 B2 * 12/2012 Asthana .............. H04L 12/1822 709/204

(Continued)

OTHER PUBLICATIONS

'Systems for attending multiple conferences in parallel using single endpoint', Mar. 3, 2017, IP.com, IPCOM000249565D, p. 1 (Year: 2017).*

(Continued)

Primary Examiner — Thomas J Dailey
(74) Attorney, Agent, or Firm — Foley & Lardner LLP

(57) ABSTRACT

Methods and systems disclosed herein describe automatically establishing two concurrent electronic communication sessions. Participants of a primary electronic communication session may request a private (secondary) electronic communication session in which only a subset of the participants of the primary electronic communication session can participate. Methods and systems described herein also describe automatically identifying participants of the second electronic communication session based on various factors including predetermined lists, commonality among different users or user identifiers, and geographic location of each participant of the primary and/or secondary electronic communication session. The methods and systems described herein also describe monitoring location of all participants of the primary and secondary electronic communication sessions and causing input and output elements of various electronic devices based on each user's location and/or whether the user is participating in the secondary or primary electric communication session.

20 Claims, 7 Drawing Sheets

(56) References Cited

U.S. PATENT DOCUMENTS

| | | | | |
|---|---|---|---|---|
| 8,654,953 | B2* | 2/2014 | Boss | H04M 3/56 |
| | | | | 348/14.08 |
| 8,749,610 | B1* | 6/2014 | Gossweiler | H04L 12/1827 |
| | | | | 348/14.08 |
| 9,118,809 | B2* | 8/2015 | Anderson | H04L 12/18 |
| 9,338,285 | B2* | 5/2016 | Anderson | H04L 12/18 |
| 9,787,848 | B2* | 10/2017 | Kaye | H04W 4/12 |
| 9,788,163 | B2* | 10/2017 | Haro | G01S 5/0284 |
| 9,877,298 | B1* | 1/2018 | Knas | H04W 64/00 |
| 2008/0267095 | A1* | 10/2008 | Sekaran | H04L 12/66 |
| | | | | 370/260 |
| 2014/0267550 | A1* | 9/2014 | Nimri | H04N 7/152 |
| | | | | 348/14.03 |
| 2015/0029901 | A1* | 1/2015 | Patel | H04L 65/4038 |
| | | | | 370/261 |

OTHER PUBLICATIONS

'Advance Conference calling features' Dec. 7, 2015, IP.com, IPCOM000244370D, pp. 4-6 (Year: 2015).*

'Systems for attending multiple conferences in parallel using single endpoint', Mar. 3, 2017, IP.com, IPCOM00249565D, p. 1 (Year: 2017).*

Daniel Minoli, Satellite Systems Engineering in an IPv6 Environment, CRC Press Taylor and Francis Group, 2009. p. 228) (Year: 2009).*

* cited by examiner

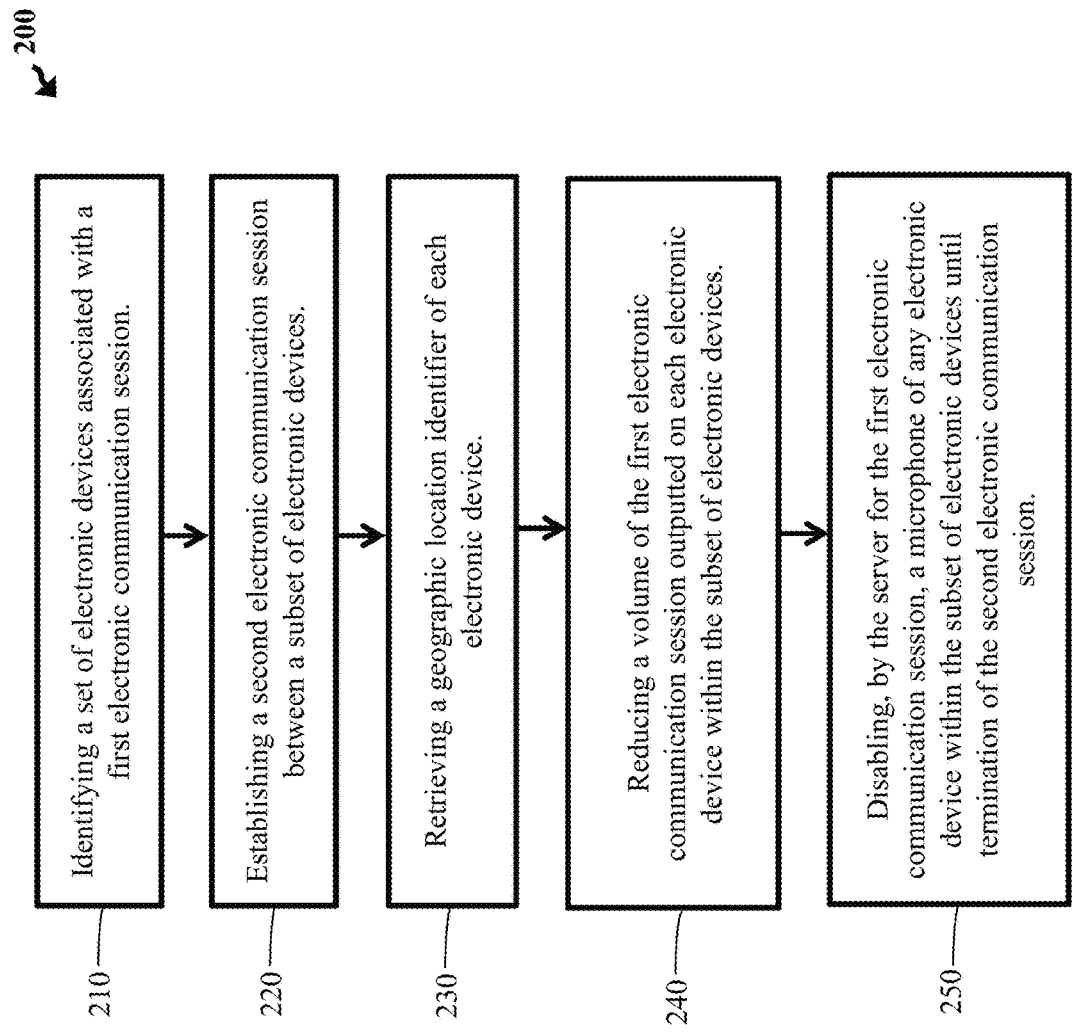

US 11,032,335 B1

CONCURRENT SECONDARY ELECTRONIC COMMUNICATION SESSION

TECHNICAL FIELD

This application relates generally to establishing concurrent electronic communication sessions between different electronic devices.

BACKGROUND

As the processing power of computers have increased and as the Internet technology era allows for greater computer functionality and efficient computing system interconnectivity, more people use electronic communication sessions to virtually meet, discuss, and share information. For instance, many employees rely on electronic communication sessions (e.g., audio and/or video teleconference) to conduct various discussions with coworkers/clients and to share various files and work product.

Since the use of the electronic communication session has become ubiquitous, users have discovered many technical shortcomings. For instance, while connected to a group of people in a teleconference, a user may desire to have a secondary private communication with a selected group of participants. However, conventional electronic communication sessions do not provide this functionality. Conventionally, users must pause the electronic communication session (e.g., place a teleconference on hold or mute the line) to internally discuss private matters. This has created a negative user experience because, first, participants who are not participating in the private conversation must wait until the private conversation has ended. Second, participants of the private conversation must then initiate a separate secondary electronic communication session every time they desire to privately discusses a matter. This is more difficult and complicated for private communication sessions involving a high number of participants or geographically dispersed participants. Third, participants not participating in the private conversation will be aware of the private conversation, which may be undesirable.

SUMMARY

For the aforementioned reasons, there is a need for a surreptitious secondary communication session where a user may privately communicate with one or more participants of a primary electronic communication session. There is a need for a system to efficiently identify the secondary communication sessions' participants and automatically establish a connection allowing the identified participants to be involved in the primary and secondary communication sessions concurrently.

In an embodiment, a method comprises identifying, by a server, a set of electronic devices associated with a first electronic communication session; upon receiving an instruction from a first electronic device within the set of electronic devices during the first electronic communication session to establish a second communication session between a subset of the set of electronic devices: establishing, by the server, the second electronic communication session between the subset of electronic devices; reducing, by the server, a volume of the first electronic communication session outputted on each electronic device within the subset of electronic devices, whereby each electronic device within the subset of the set of electronic devices allows users to listen to audio of the second electronic communication session rather than the first electronic communication session; and disabling, by the server for the first electronic communication session, a microphone of any electronic device within the subset of electronic devices until termination of the second electronic communication session.

In another embodiment, a computer system comprises a set of electronic devices configured to communicate with each other via a first electronic communication session; a subset of the set of electronic devices configured to communicate with each other via a second electronic communication session; and a server in communication with the set and subset of electronic devices, the server configured to: identify a set of electronic devices associated with a first electronic communication session; upon receiving an instruction from a first electronic device within the set of electronic devices during the first electronic communication session to establish a second communication session between a subset of the set of electronic devices: establish the second electronic communication session between the subset of electronic devices; reduce a volume of the first electronic communication session outputted on each electronic device within the subset of electronic devices, whereby each electronic device within the subset of the set of electronic devices allows users to listen to audio of the second electronic communication session rather than the first electronic communication session; and disable, for the first electronic communication session, a microphone of any electronic device within the subset of electronic devices until termination of the second electronic communication session.

It is to be understood that both the foregoing general description and the following detailed description are exemplary and explanatory and are intended to provide further explanation of the disclosed systems and methods for providing beacon-based navigation system.

BRIEF DESCRIPTION OF THE DRAWINGS

The foregoing summary, as well as the following detailed description, is better understood when read in conjunction with the appended drawings. For illustrating the claimed subject matter, the drawings show example constructions of various embodiments. However, the claimed subject matter is not limited to the specific methods and instrumentalities disclosed.

FIG. 2 illustrates a flowchart depicting operational steps of establishing a secondary concurrent electronic communication session, according to an embodiment.

DETAILED DESCRIPTION

The subject matter of the described embodiments is described with specificity to meet statutory requirements. However, the description itself is not intended to limit the scope of this patent. Rather, the inventors have contemplated that the subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
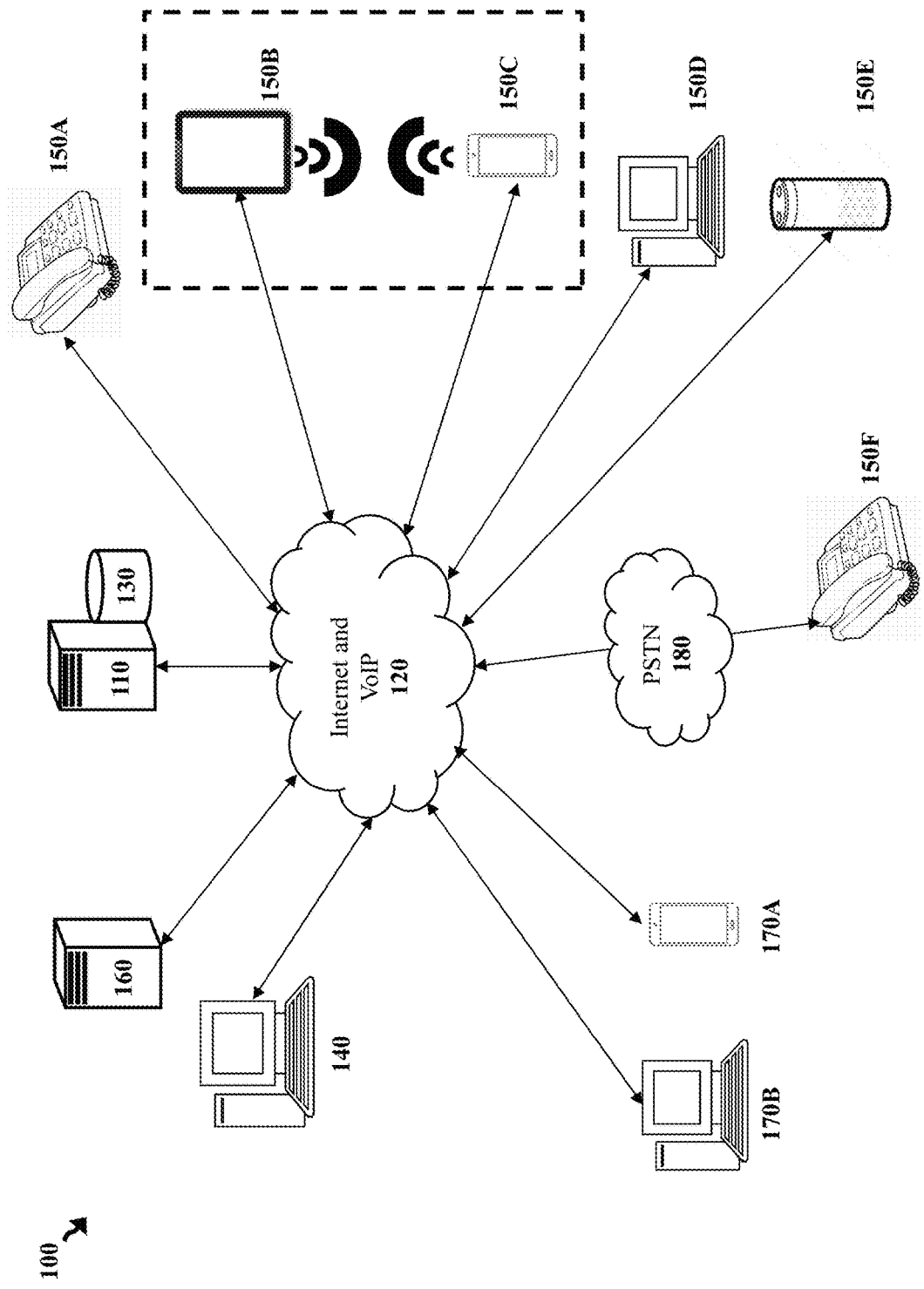
FIG. 1 illustrates an example of a computer environment for establishing a secondary concurrent electronic communication session, according to an embodiment.

FIG. 1 illustrates components of a system 100 to establish concurrent electronic communication sessions, according to an embodiment. In at least one configuration, the system 100 comprises an analytics server 110, communication network (Internet and VoIP network 120) comprising Internet and VoIP, database 130, administrative computer 140, electronic devices 150A-150F (collectively electronic devices 150), third party server 160, electronic devices 170A-170B (electronic devices 170), and a PSTN 180.

In operation, the analytics server 110 uses the Internet and VoIP network 120 and/or PSTN 180 to establish primary and secondary electronic communication sessions among electronic devices 150 and/or electronic devices 170. As described below, the analytics server 110 may receive an instruction from an electronic device to establish a secondary electronic communication session, select a group of electronic devices for the secondary communication session, and establish a concurrent electronic communication session where one or more electronic devices could privately communicate while still participating in the primary electronic communication session.

While certain embodiments described herein use telephonic communication as an example of electronic communication sessions, electronic communication sessions are not limited to telephonic sessions. Non-limiting examples of an electronic communication session may include a teleconference, phone call, chat session, audio and/or video conference, and the like. Furthermore, the analytics server may establish the primary and the secondary communication sessions using different electronic communication channels. Therefore, the primary and secondary electronic communication sessions may or may not use the same method of communication. For instance, while a primary communication session among electronic devices 150 and electronic devices 170 may be telephonic, a secondary communication session among electronic devices 150 may be a videoconference or an electronic chat session.

The analytics server 110 may use three general classes of telephonic networks: PSTN 180, cellular networks (not shown), and Internet and VoIP network 120. PSTN 180 may be characterized as a circuit-switched telephony system establishing lossless connections and high fidelity audio. In some configurations, components of the cores of the PSTN 180 may be replaced by internet protocol (IP) connections, but private links of PSTN 180 may remain tightly controlled to ensure near-zero packet loss. The analytics server 110 may also use cellular networks (CDMA and/or GSM protocols) to establish a telephonic electronic session among different electronic devices. Like PSTN 180, cellular networks have a circuit-switched core, with portions that may be replaced by IP links. While these networks can have considerably different technologies deployed in their wireless interfaces, the cores of cellular networks may be similar to PSTN 180. Lastly, VoIP networks 120 may run on top of IP links and generally share paths as other Internet-based traffic. The analytics server 110 may utilize a variety of existing methodologies to establish an electric communication session using VoIP.

The analytics server 110 may also utilize a variety of technologies and methodologies to establish electronic communication sessions among different electronic devices described herein. In addition to telephonic audio connections described above, the analytics server 110 may use homegrown or other chat applications where one or more electronic devices can transmit text or other media elements to each other. The analytics server 110 may also use the Internet and VoIP network 120 to establish a videoconference among one or more electronic devices. In some configurations, the analytics server 110 may also use a third-party application to establish an electronic communication session among the electronic devices described herein.

The analytics server 110 may monitor and execute various analytics on ongoing electronic communications. For instance, the analytics server 110 may continuously monitor and capture audio and/or video files comprising content of each electronic communication session. As described below, the analytics server 110 may also use the captured audio and/or video content to generate various analytics regarding each electronic communication session. For instance, the analytics server 110 may transmit the generated data to the third-party server 160, where the third-party server 160 executes a transcription protocol and generates a real-time transcript of an electronic communication session. The third-party server 160 may also execute other text/speech analytics to identify tone, topic, context, and other metrics regarding the electronic communication sessions. As described below, the analytics server 110 may display the analytic data regarding different electronic communications to one or more electronic devices.

The analytics server 110 may be any computing device comprising a processor capable of performing the various tasks and processes described herein. Non-limiting examples of the analytics server 110 may include a server, desktop, laptop, tablet, and the like. The analytics server 110 comprises any number of computer-networking components, which facilitate inter-device communications via the Internet and VoIP network 120. There may be any number of distinct computing devices functioning as the analytics server 110 in a distributed computing environment.

The analytics server 110 may transmit data records to an internal or external database, such as the database 130, where the data records may be stored and where various analytics may be performed on the stored data in accordance with instructions from the analytics server 110. For instance, all location data, electronic communication metrics, notification data, user preferences, participants in a primary and/or secondary electronic communication session, and any other data received/captured in conjunction with establishing concurrent electronic communication sessions may be stored in the database 130 and analyzed to provide better and more accurate services. In a non-limiting example, the analytics server 110 may keep a record of different participants for a secondary communication session and may suggest participants for secondary location sessions in the future.

The analytics server 110 may also host an online service, such as cloud-computing application service, a website, or any other service that provides customer-facing web-based applications that generate multiple electronic communication sessions among different electronic devices, collect data regarding different user preferences, and the like. For instance, a user may provide a predetermined list of participants in a private teleconference. Additionally or alternatively, the analytics server 110 may be utilized as a mobile application or a browser extension executing in the background and without disrupting a user's operations. For instance, the mobile application or the browser application may be monitoring for primary electronic communication sessions established.

Once the analytics server 110 identifies that an electronic session is established, the mobile application or browser application is pushed to the foreground (e.g., displays a prompt to the user) providing the user with the option of establishing concurrent secondary electronic communication sessions. Therefore, the methods and systems described herein can be used in conjunction with other third-party telecommunication applications without burdening the user or cluttering the display of the electronic device.

The analytics server 110 may use various location tracking protocols to monitor location of each electronic device. When applicable, the analytics server 110 may use an electronic devices internet protocol address or a pre-populated location to identify a location of an electronic device (e.g., landlines). In other configurations, such as mobile devices, the analytics server 110 may use GPS tracking, location triangulation methods, Bluetooth low energy (BLE) transmission technology, and/or beacons to monitor a location of each electronic device.

As used herein, the term "Beacon" applies to any device, mobile or fixed, that is capable of transmitting a data packet. Beacon transmitters (not shown in FIG. 1) may broadcast an identifier to nearby portable electronic devices located within a predetermined proximity. A data packet can be the same as defined in the Bluetooth specification or any other data packet that transmits a unique identifier. Beacon may (repeatedly, continuously, or periodically) transmit data packets in set (or adjustable) intervals. In a non-limiting example, the beacon location tracking system disclosed herein may utilize iBeacons (a form of beacon) to transmit a data packet consisting mainly of three pieces of information—a Universally Unique Identifier (UUID), a major field, and a minor field. In addition, an iBeacon typically transmits that data packet repeatedly.

In one embodiment, different the analytics server 110 may use these beacons or transmitters as a hyper-local device tracking mechanism to locate electronic devices. Non-limiting examples of transmitters include an iBeacon, AltBeacon, and EddyStone, a wireless router, a cellular phone, a tablet, a workstation, or any other suitable computing or other electronic device. The UUID portion of the data packet may be associated with an entity (e.g., employer) while the major and minor field may identify specific zone (e.g., geo-fence) within a particular area (e.g., particular office). As described below, the analytics server 110 may be in direct connection with the electronic devices 150 and/or 170 through an application installed and executing on each electronic device.

Additional information can be gleaned from beacon signals, including an approximate distance between a beacon transmitter and an electronic device. Beacon transmitters can be programmed to broadcast their signals at different power levels, known as the "Broadcasting Power." For example, the beacon transmitters can transmit UUIDs corresponding to a Received Signal Strength Indicator (RSSI), which identifies proximity or signal strength. The analytics server 110 may utilize multiple beacons within a predetermined area where each beacon is associated with different RSSI and UUID data packets.

In some embodiments, an electronic device can also transmit a data packet, acting as a beacon, which can be received by another receiving device, fixed or mobile. In either case, fixed or mobile, this reception serves to notify the receiver that the mobile transmitter is nearby. As an example, a mobile application can instruct an electronic device to transmit a data packet associated with a network identity, which upon reception at another device, fixed or mobile, can indicate proximity of a user to the network or other electronic devices. For example, receiving devices can be placed throughout a building. These receiving devices would monitor the electronic devices' location to track the users. The system of this embodiment can then store the information of which transmitters the user went past, and the user can use an application to retrieve this information. In this way, the beacon transmitters may not need permanently installed to constantly transmit data packets; and depending on the number of transmitters needed, there can be significant cost/complexity savings using this method.

In some embodiments, analytics server 110 can use RSSI or triangulation to assess, more accurately, the location of electronic devices 150 and/or 170. For instance, an electronic device may receive signals from more than one source or of more than one type, e.g., Wi-Fi, BLE, and GPS. By relying on more than once source, these embodiments are more reliable and more accurate. Even though the embodiments disclosed herein describe using beacon technology, it is expressly understood that the location of a user may be determined using any other technology such as Wi-Fi, BLE, and/or GPS. The embodiments disclosed herein are not limited to beacon technology.

In some configurations, the analytics server 110 may only identify whether an electronic device is located near another electronic device participating in the primary electronic communication session. For instance, the analytics server 110 may not identify a location of one or more electronic devices. However, the analytics server 110 may use data retrieved from other electric devices to identify whether an electronic device participating in the primary electronic communication session is located near another electronic device participating (or requesting) the secondary electronic communication device. For instance, the analytics server 110 may use Wi-Fi or BLE location identification technology or other intercommunication between electronic devices 150 or 170 to determine whether two electronic devices participating in the primary electronic communication session are located near each other (e.g., within a predetermined proximity).

In a non-limiting embodiment, the analytics server 110 may monitor intercommunications (BLE or other wireless communication) between electronic device 150B and 150C to retrieve proximity data from these devices. For instance, the electronic device 150C may communicate (using BLE or other wireless technology) its location/proximity information to the electronic device 150B (or a router connected to both devices). The analytics server 110 may retrieve the location information of the electronic device 150C from the electronic device 150B. In this way, the analytics server 110 may identify that the electronic device 150C is located near 150B without necessarily receiving any location identification information directly from the electronic device 150C or knowing a location of the electronic device 150B or 150C. Using this method, the analytics server 110 may allow electronic devices to identify whether they are proximate to other electronic devices. As will be described below, the analytics server 110 may use this proximity identification (in conjunction with identifying location information or used the sole method) to identify which electric devices should participate in the secondary electric communication session.

Electronic devices 150 and/or 170 may represent any electronic device configured to establish an electronic communication session with another electronic device. Non-limiting examples of electronic devices 150 and 170 may include a landline telephone 150A, a tablet 150B, a smart phone 150C, a desktop 150D, a voice activated assistant electronic device 150E, and the like. As described throughout, the analytics server 110 may use Internet and VoIP, PSTN, and/or cellular networks to establish electronic communication sessions between each of the electronic devices.

The analytics server 110 may also display metrics or other information on an administrator computer 140, where an administrator can monitor electronic communication sessions, their participants, and various metrics regarding the concurrent electronic communication sessions established by the analytics server 110. For example, the analytics server 110 may display a list of all participants of a primary or a secondary communication session on the administrator's computer 140 where an administrator can revise the participants by adding or removing participants from the primary and/or the secondary communication session.

In operation, the analytics server may establish a primary electronic communication session between the electronic devices 150 and 170. Upon receiving an instruction, the analytics server 110 may then establish a secondary electronic communication session between a predetermined list of electronic devices 150 or the electronic devices 170, where the electronic devices within the primary electronic communication cannot participate in the secondary electronic communication session. The analytics server 110 may also dynamically mute the participants of the secondary electronic communication session on the primary electronic communication session.

Referring now to FIG. 2, a flowchart depicting operational steps of a method for providing a secondary electronic communication session is illustrated. Steps of the method 200 may be implemented using one or more computing features described FIG. 1. Method 200 does not imply any limitations with regard to the environments or embodiments that may be implemented. Modifications to the depicted environment or embodiment shown in FIG. 2 may be made.

At step 210, the analytics server may identify a set of electronic devices associated with a first electronic communication session. The analytics server may identify that a group of electronic devices are participating in a first electronic communication session (e.g., primary communication session). Non-limiting examples of an electronic communication session may include a teleconference phone call, chat session, audio and video conference, and the like. The analytics server may identify a first set of electronic devices (e.g., telephone, smart mobile phone, and a videoconference session) are connected to each other via one or more telecommunication applications.

The analytics server may either establish the electronic communication session or may monitor electronic communication sessions established a by a third-party application. In some configurations, the analytics server may be a central server that establishes the electronic communication between the first set of electronic devices. In some embodiments, the electronic server may continuously monitor electronic devices to identify whether the electronic devices are participating in one or more electronic communication sessions. For instance, the analytics server may be in direct communication with an application executing on each electronic device to monitor where an electronic device having the mobile application initiates (or causes a telecommunication application or a server to initiate) an electronic communication session. The mobile application may send an indication to the analytics server that the electronic device has initiated an electronic communication session. The notification may also include an identifier of the electronic communication session and/or its participants. The analytics server may then retrieve or identify a list of electronic devices participating in electronic communication session matching the received identifier.

At step 220, the analytics server may, upon receiving an instruction from a first electronic device within the set of electronic devices during the first electronic communication session to establish a second communication session between a subset of the set of electronic devices, establishes a second electronic communication session between a subset of electronic devices. The analytics server may receive an instruction to establish a secondary communication session from one or more electronic devices participating in the primary communication session. The request may be electronically sent to the analytics server via a user operating an application executing on an electronic device, as described in FIG. 3A. In some configurations, the request may be received via a push button component of an electronic device. For instance, a user may program a keypad of a telephone or other telecommunication device to instruct the analytics server to establish a secondary concurrent electronic communication device. For instance, a user may request a private/secondary electronic communication session by pressing "#" or "*" or a combination of different numbers using a standard telephone keypad.

Upon receiving an instruction from at least one electronic device participating in the primary electronic communication session, the analytics server may establish a concurrent secondary electronic communication session. The analytics server may first identify the user requesting the secondary electronic communication session in order to identify other participants of the secondary electronic communication session. The analytics server may use a variety of method to identify the electronic device (or the user operating the electronic device) transmitting the request to establish the secondary electronic communication session. The analytics server may retrieve the first electronic device's electronic identifier (e.g., internet protocol address, media access control address, phone number, and electronic mail address) to identify a user submitting the request.

The analytics server may also identify a subset of electronic devices associated with the secondary communication session. To identify the subset of electronic devices, the analytics server may use a variety of methods. In some configurations, the analytics server may use one or a combination of the following methods:

First, the analytics server may retrieve a predetermined list of participants of the secondary electronic communication session. Upon identifying the first electronic device, the analytics server may query a database to receive a predetermined list of participants related to the first electronic device (or the user operating the first electronic device). For instance, a user operating the first electronic device may identify (e.g., select) a group of electronic devices to connect with using a concurrent secondary electronic communication session. In some configurations, the predetermined list may be dependent upon one or more participants of the primary electronic communication session. For instance, a user may select a group of other users to participate in a secondary electronic communication session only when the primary electronic communication session includes a preselected user.

In some configurations, the analytics server may retrieve one or more predetermined rules to generate a list of participants for the secondary electronic communication session. For instance, a preloaded rule may indicate that if user 1 is a participant of the primary electronic communication session, user 2 should always (or never) be included as a participant of the secondary electronic communication session.

Second, the analytics server may dynamically identify the list of participants using identifiers of each electronic device. The analytics server may generate the list of participants if an identifier indicates a commonality among a group of electronic devices. For instance, if the primary electronic communication session is established between Users 1-5, the analytics server may identify that users 1, 2, and 3 are connected via internet protocol addresses that indicate a common connection (e.g., same prefix or first digits that indicate that users 1, 2, and 3 are associated with the same internet connection or entity). Therefore, when user 2 requests a secondary electronic communication session, the analytics server establishes the secondary electronic communication session among users 1, 2, and 3. In another example, the analytics server may user an e-mail handle, or MAC address to identify the list of participants. The analytics server may also retrieve a profile of each electronic device and identify whether they are associated with the same entity in order to achieve the same results.

Third, the analytics server may identify participants of the secondary communication session via each electronic device's location. As described above, the analytics server may use a variety of location-tracking methods to identify a location of each electronic device. The analytics server may generate the list of participants based on their relative proximity to each other and/or their proximity to the first electronic device requesting the electronic secondary communication session. For instance, the analytics server may establish the secondary electronic communication session among all electronic devices located within 10 ft. of the first electronic device.

Fourth, the analytics server may suggest a participant of the secondary electronic communication session based on his or her proximity to the first electronic device. When the analytics server receives a request from an electronic device to establish the secondary electronic communication session, the analytics server may identify one or more electronic devices participating in the primary electronic communication session that are within a predetermined proximity to the electronic device submitting the request. The analytics server may then suggest the users identified as being located within the predetermined proximity as possible participants of the secondary electronic communication session. As will be described below, the analytics server may suggest one or more participants based on their proximity to the electronic device submitting the request, whereby the electronic device submitting the request may add and/or remove any suggested participant.

The analytics server may dynamically revise the list of participants of the secondary electronic communication session. As will be described below, the first user may revise the list of participants of the secondary electronic communication session at anytime during the electronic communication session. The analytics server may generate a graphical user interface displaying the list of participants of the secondary electronic communication session where the first user may add or remove any participants.

In response to identifying the participants of the secondary electronic communication session, the analytics server establishes a secondary electronic communication among the identified participants using the methodologies described above.

The analytics server may also revise the list of participants of the secondary electronic communication session by monitoring the location of each participant. As described above, the analytics server may include one or more electronic devices participating in the secondary communication session based on their geographical location. The analytics server may also remove/revise the participant list based on their respective geographical location. For instance, if the analytics server detects that a user/electronic device is no longer within the predetermined proximity to the first electronic device (e.g., user is walking away from the first electronic device), the analytics server may remove the user/electronic device from the list of participants of the secondary electronic communication session. As a result, the analytics server may no longer output communication (audio and/or video) of the secondary communication session on the electronic device.

At step 230, the analytics server may retrieve a geographic location identifier of each electronic device within the subset of electronic devices. As described above, the analytics server monitors geographic location of each electronic device participating in the primary and/or secondary electronic communication sessions.

At step 240, the analytics server may reduce a volume of the first electronic communication session outputted on each electronic device within the subset of electronic devices, whereby each electronic device within the subset of the set of electronic devices outputs audio of the second electronic communication session rather than the first electronic communication session. The analytics server may cause an output component of each electronic device within the subset of electronic devices to output audio or video associated with the first electronic communication session in accordance with a predetermined volume level.

The analytics server may modify the audio and/or video output of the primary electronic communication session outputted on the electronic devices participating in the secondary electronic communication session. For instance, electronic device participating in the second electronic communication session may output audio of the primary electronic communication session at a lower volume (including no volume).

In another example, electronic device participating in the second electronic communication session may output video feed of the primary electronic communication session in a smaller portion of the display screen (e.g., split screen where the video feed of the primary and secondary electronic communication sessions are simultaneously displayed). The primary electronic communication can share the screen with the secondary electronic communication session or be replaced by the secondary electronic communication session during the second electronic communication session.

The analytics server may receive the above-described output thresholds (e.g., audio volume or video size thresholds) from an administrator device or each user device. Therefore, each user can customize the volume or video output attributes of the primary electronic communication session on their electronic device. In some configurations, a user may also mute the primary electronic communication session.

At step 250, the analytics server may disable, for the first electronic communication session, a microphone of any electronic device within the subset of electronic devices until termination of the second electronic communication session. The analytics server may generate and transmit an instruction to the electronic devices associated with the secondary electric communication session to disable their input components (e.g., microphones or cameras). As a result, audio and video inputted by those electronic devices are only transmitted to the secondary electronic communication sessions.

While the second electronic communication session is established among the subset of the set of electronic devices, the analytics server may disable the microphone (or other audio or video input elements) associated with each electric device participating in the secondary electronic communication session. The analytics server may deny said electronic devices from participating in the primary electronic communication session. Therefore, electronic devices participating in the secondary electric communication sessions cannot accidentally (or purposefully) participate in the primary electronic communication session. However, these electronic devices can participate in the secondary electronic communication session.

Once the secondary electric communication session is terminated, the analytics server causes the electronic devices participating in the secondary electronic communication session to resume outputting audio/video of the primary electronic communication session at its previous volume/size. The analytics server then also re-activates the microphone (or other input elements) previously disabled. As a result, electronic devices participating in the terminated secondary electronic communication sessions may resume participating in the primary electronic communication session.

In some configurations, when a first electronic device participating in the primary electronic communication session is within a predetermined proximity to a second electronic device participating in the secondary electronic communication session, the analytics server may disable an audio input component of the first electronic device. In this way, the audio input element of the first electronic device will not interfere with the private communication of the secondary electric communication session.

FIGS. 3A-3D illustrates an example of establishing a secondary concurrent electronic communication session, according to an embodiment. More specifically, FIGS. 3A-3D illustrate a non-limiting example of user experience while a server, such as the analytics server described throughout, establishes a secondary electronic communication session. While the embodiments depicted in FIGS. 3A-3D relate to an establishing telephonic communication sessions, it is expressly understood that the methods and systems described herein apply to any other electronic communication sessions, such as chat sessions, video conferences, and the like.

Figure 3A:
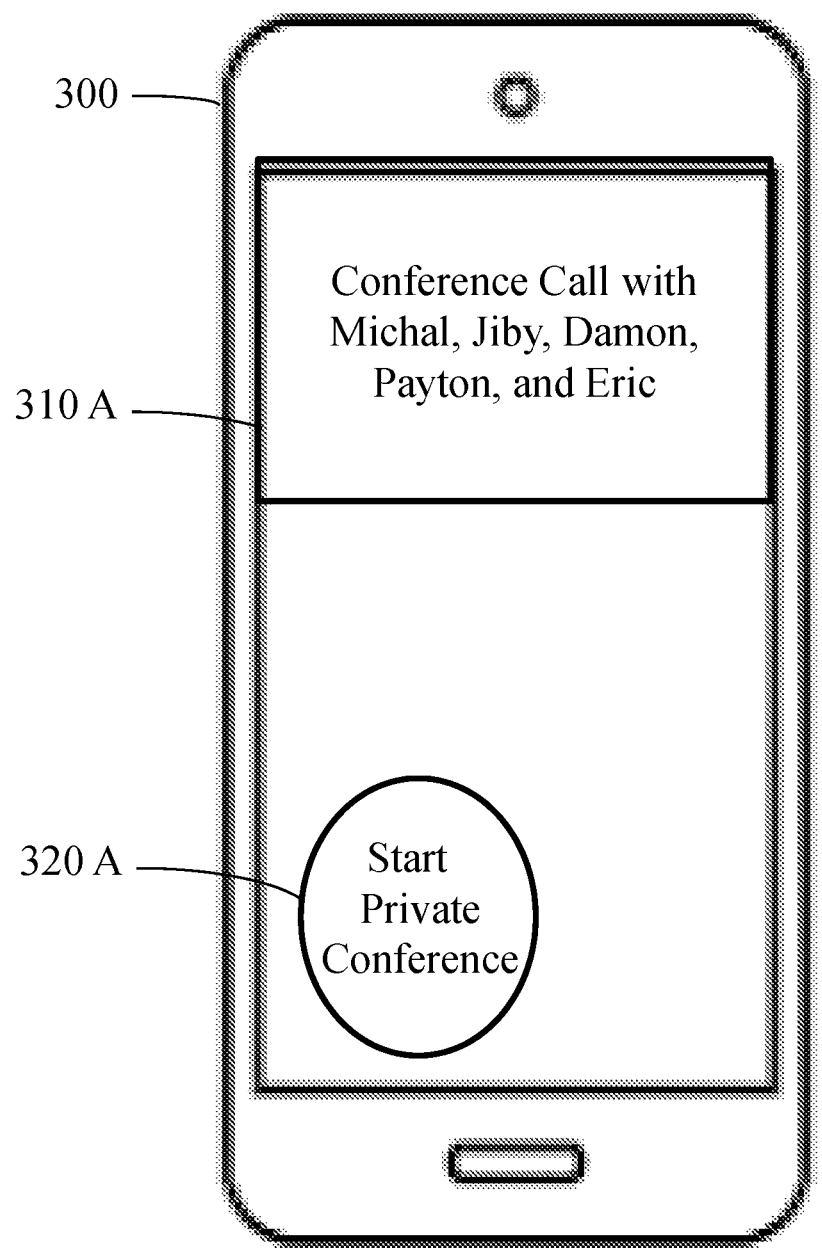
FIGS. 3A-3E illustrate an example of the user experience of establishing a secondary concurrent electronic communication session, according to an embodiment.

In FIG. 3A, a user initiates an application executing on mobile device 300 (e.g., smart cellular device) to participate in an electronic communication session. The user may use the application to establish an audio communication session (e.g., conference call) with multiple other electronic devices, using their identifiers (e.g., phone numbers). As illustrated in the graphical component 310A, the mobile device 300 is connected to electronic devices associated with Michal, Jiby, Damon, Payton, and Eric via a teleconference established by the analytics server.

The application executing on the mobile device 300 may also display an interactive graphical component 320A where a user operating the mobile device 300 may interact with to initiate a secondary communication session. When the user interacts with the interactive graphical component 320A, the analytics server displays the graphical user interface depicted in FIG. 3B.

Figure 3B:
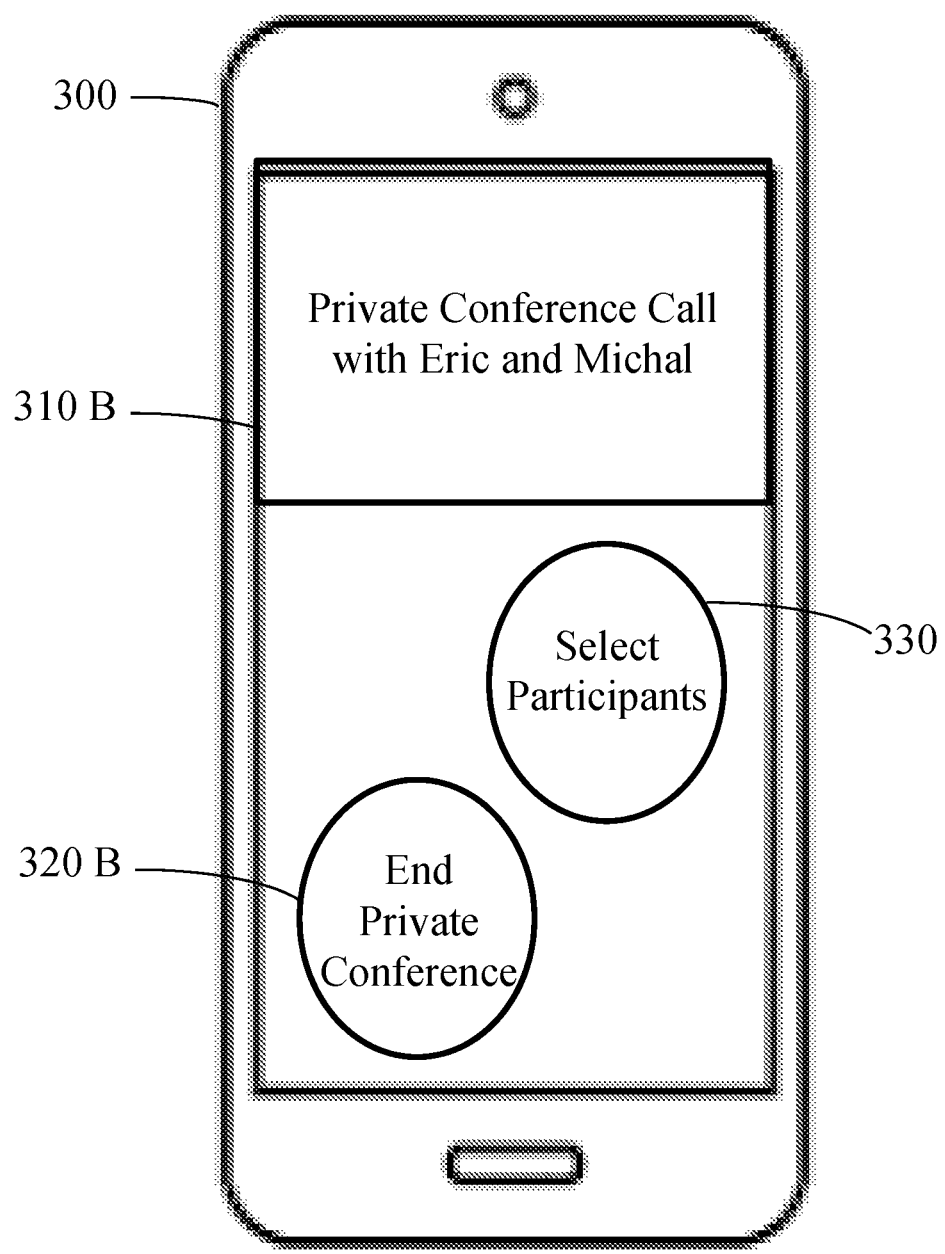

As illustrated in FIG. 3B, when the user interacts with the interactive graphical component 310B, the analytics server establishes a secondary electronic communication session with electronic devices (e.g., telephone) associated with Eric and Michal. As described above, the analytics server may use a variety of methods to establish the secondary electronic communication session. For instance, the analytics server may initiate a chat session among a selected group of participants.

The analytics server may also display an interactive graphical component 330 providing the user with the option to select or deselect participants of the secondary electronic communication session. For instance, when the user interacts with the interactive graphical component 330, the analytics server displays the graphical user interface illustrated in FIG. 3C.

Figure 3C:
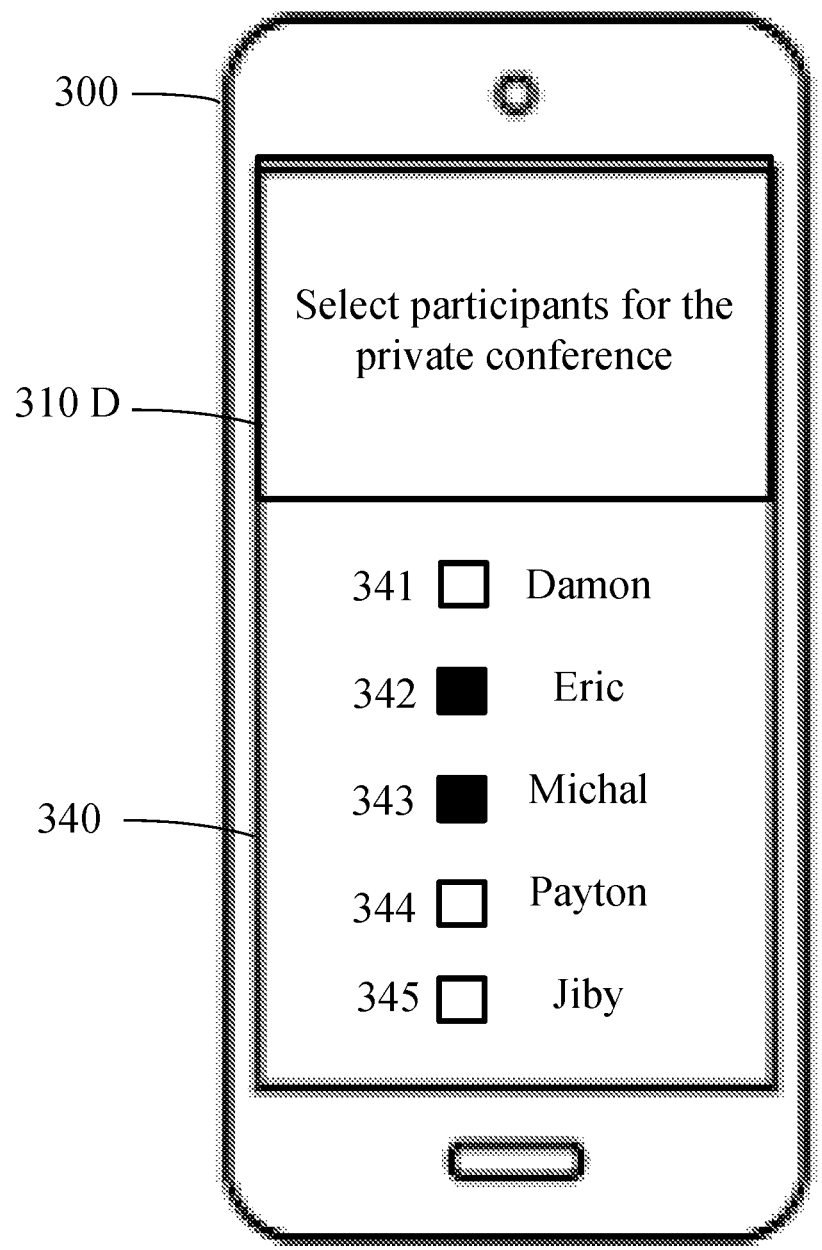

As illustrated in FIG. 3C, the analytics server provides the user the option to select participants of the secondary electronic communication session, as depicted in graphical component 310D. As depicted in graphical component 340, the analytics server may display a list of participants of the primary electronic communication session accompanied by an interactive input element (e.g., 341-345) where the user can select or deselect participants of the secondary electronic communication session. For instance, the secondary electronic communication session is established between the mobile device 300 and electronic devices of Eric and Michal. However, the user operating the mobile device 300 (as the creator of the secondary electronic communication session) may revise the above-described list.

While the analytics server establishes a secondary electronic communication between the mobile device 300 and electronic devices associated with Eric and Michal, the analytics server may also lower the audio output volume for the first electronic communication session on the mobile device 300 (and/or all participants of the secondary electronic communication session). Therefore, the mobile device 300 simultaneously outputs data captured/communicated during the first and the second electronic communication sessions. In this way, participants of the secondary electronic communication session can participate in the both the first and second electronic communication session.

As described above, the analytics server may also continuously monitor geographic location of each participant of the secondary (and/or primary) electronic communication session and may mute (e.g., disable an audio or input element) of any electronic device within a predetermined proximity to a participants of the secondary electronic communication session. For instance, if an electronic device operated by Damon (who is not participating in the secondary communication session) is within a predetermined proximity (e.g., five ft.) of the mobile device 300, the analytics server may disable an input element (e.g., microphone) of Damon's electronic device for the primary electronic communication session. In this way, the conversation of the secondary electronic communication session is not conveyed to the primary electronic communication session via Damon's electronic device.

If the analytics server identifies that another electronic device is within a predetermined proximity to the mobile device 300, the analytics server may suggest adding the identified electronic device to the secondary electronic communication session. As described above, the analytics server may use GPS tracking, beacons, or other location tracking technology to identify a location of the electronic devices. In some embodiments, the analytics server may only identify whether the electronic device is within a predetermined proximity to the mobile device 300 without necessarily identifying either electronic device's location. For instance, without tracking or identifying a location of the mobile device 300, the analytics server may identify that Jiby's mobile device is within a predetermined proximity to the mobile device 300. As discussed above, the analytics server may use wireless location tracking technology or Bluetooth technology to identify that Jiby's mobile device is near mobile device 300 (e.g., within 10 feet or any other predetermined threshold).

Figure 3D:
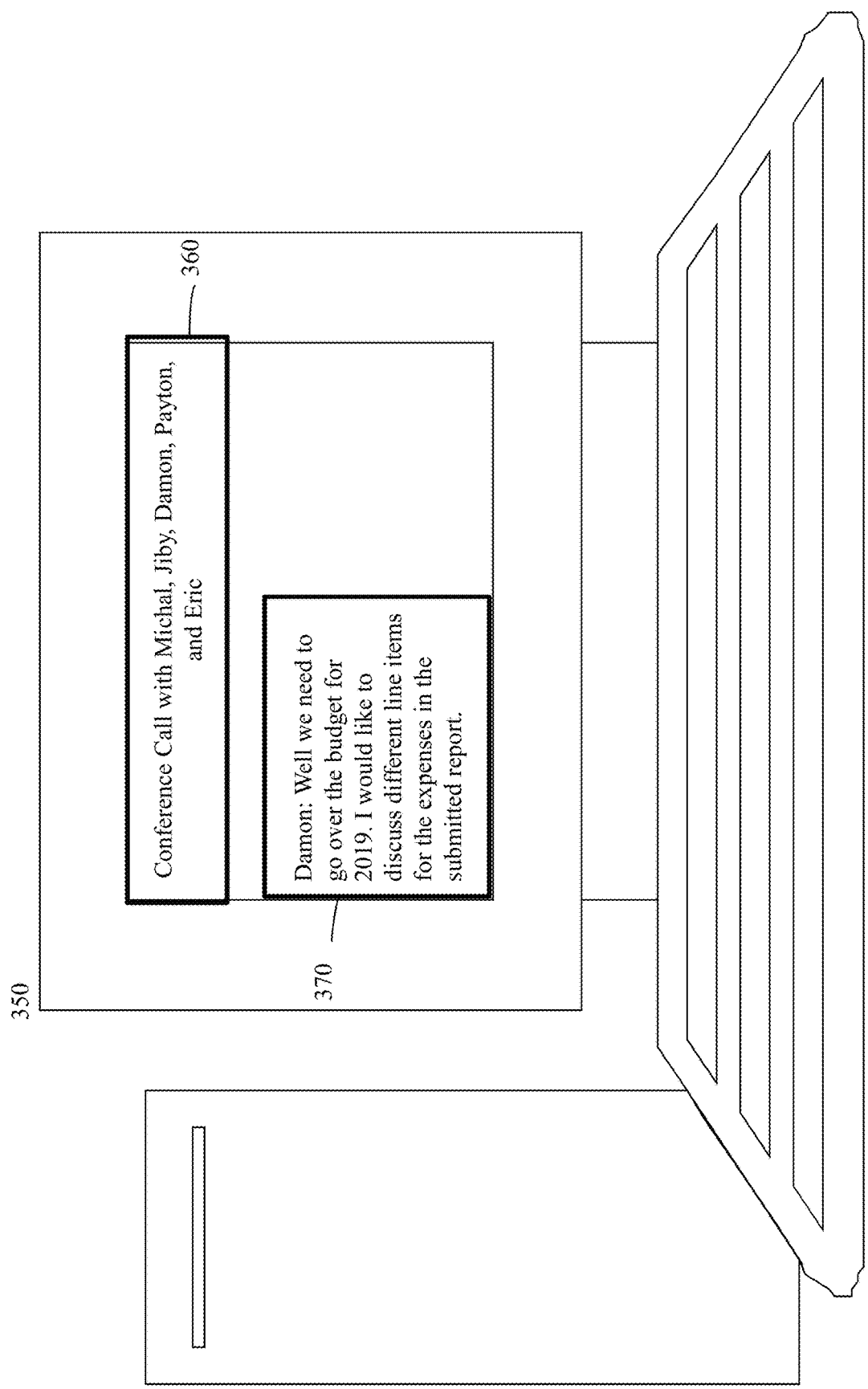
Figure 3E:
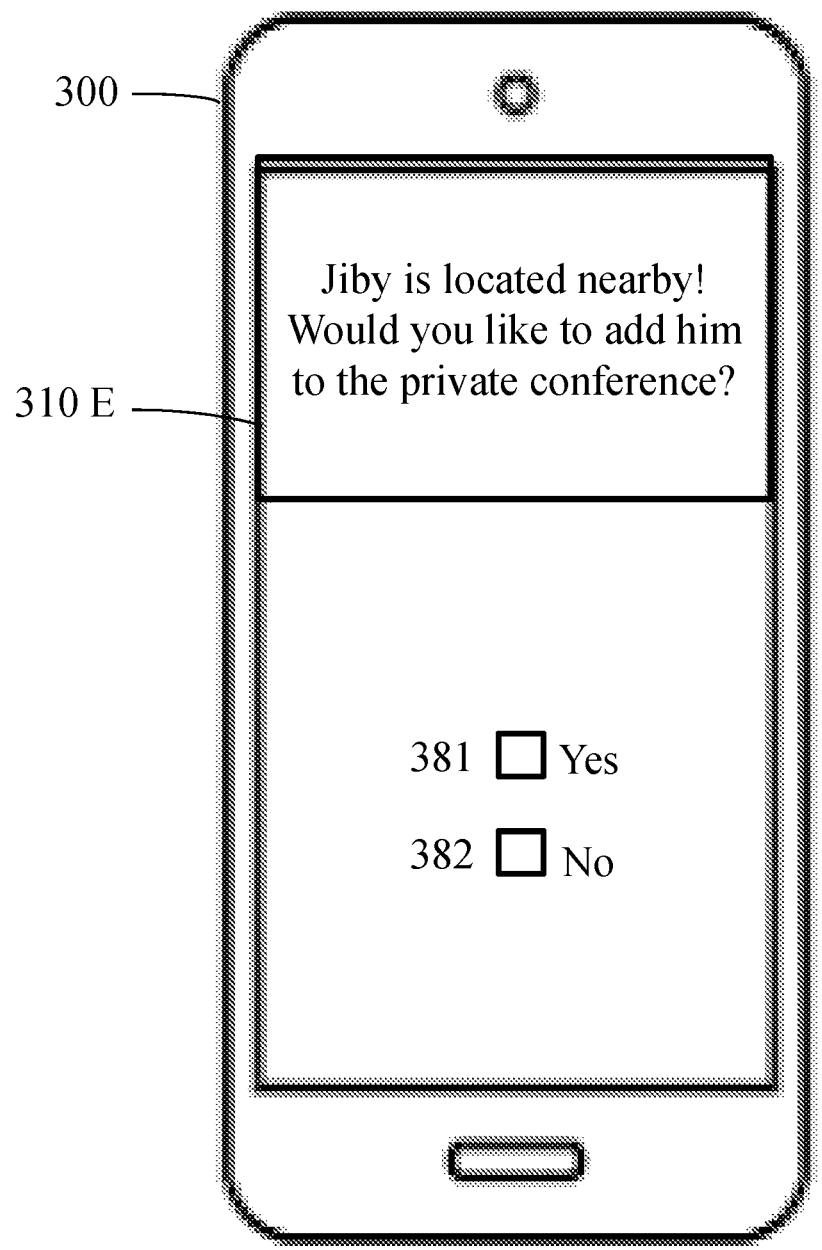

In response to identifying at least one electronic device participating in the first electronic communication session being located near the mobile device 300, the analytics server may display GUI 310E (depicted in FIG. 3E). GUI 310E informs the user operating the mobile device 300 that the analytics server has identified Jiby's phone within the predetermined proximity to the mobile device 300. GUI 310E also displays graphical components 381 and 382 where the user operating the mobile device 300 can interact with to add (or refuse to add) Jiby to the secondary electronic communication session. In some configurations, the analytics server may automatically add any electric device near the mobile device 300 to the private conference (secondary electric communication session).

In some configurations, the analytics server may also continuously monitor electronic devices participating in the first and second communication sessions. The analytics server may also execute a transcription protocol using the audio captured within the first and/or second electronic communication session. The analytics server may display the transcription on the electronic devices participating in the secondary and/or primary communication sessions. The analytics server may also update the transaction in real time.

As illustrated in FIG. 3D, the analytics server may display graphical component 370 on electronic device 350, which is operated by a participant of the secondary communication session (e.g., user of mobile device 300, Eric, or Michal). The transcription displayed in the graphical component 370 represents the conversation within the primary communication session. The analytics server may also display the participants of the primary communication session in graphical component 360. In this way, the user operating the mobile device 300 and 350 can participate in the secondary communication session while reviewing the transcript of the primary communication session (conference call).

The analytics server also provides any participant of the secondary electronic communication session to leave the secondary electronic communication session. When the user operating the mobile device 300 interacts with the interactive component 320B, the analytics server end the secondary electronic communication session and the mobile device rejoins (with a normal audio output) the primary electronic communication session.

The depicted embodiment refers to an example where the primary and secondary electronic communication sessions are established directly via the analytics server, it is also expressly understood that, in other configurations, the methods described herein can be offered as an additional service, such as an application executing on the background.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise Random Access Memory (RAM), Read Only Memory (ROM), Electrically Erasable Programmable Read-Only Memory (EEPROM), CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product. Additionally, the operations of the methods and system disclosed herein may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
 identifying, by a server, a set of electronic devices associated with a first electronic communication session;

upon receiving an instruction from a first electronic device within the set of electronic devices during the first electronic communication session to establish a second electronic communication session:
   automatically selecting, by the server, a subset of the set of electronic devices based on an attribute of a network used by each electronic device to communicate with the server to establish the first electronic communication session;
   establishing, by the server, the second electronic communication session between the subset of the set of electronic devices;
   reducing, by the server, a volume of the first electronic communication session outputted on each electronic device within the subset of the set of electronic devices to a predetermined volume level, whereby each electronic device within the subset of the set of electronic devices allows users to listen to audio of the second electronic communication session rather than the first electronic communication session; and
   disabling, by the server for the first electronic communication session, a microphone of each electronic device within the subset of electronic devices until a termination of the second electronic communication session.

2. The method of claim 1, further comprising:
displaying, by the server, a transcript of communication within the first electronic communication session on at least one electronic device associated with the subset of the set of electronic devices.

3. The method of claim 1, wherein the subset of the set of electronic devices is selected by the first electronic device.

4. The method of claim 1, wherein the subset of the set of electronic devices is selected by the server based on a location of each electronic device being within a predetermined proximity to the first electronic device.

5. The method of claim 1, wherein the subset of the set of electronic devices is further selected by the server in accordance with an identifier of each electronic device.

6. The method of claim 5, wherein the identifier of each electronic device comprises at least one of internet protocol address, media access control address, phone number, and electronic mail address associated with each electronic device.

7. The method of claim 1, wherein the first electronic communication session and the second electronic communication session are established using different electronic channels.

8. The method of claim 1, further comprising:
retrieving, by the server, a geographic location identifier of each electronic device within the set of electronic devices;
disabling, by the server for the first electronic communication session, a microphone of any electronic device within the set of electronic devices that is located within a predetermined proximity to the first electronic device until a termination of the second electronic communication session.

9. The method of claim 8, wherein the geographic location identifier of each electronic device corresponds to a GPS location or a beacon identifier.

10. The method of claim 1, wherein the server receives a revised list of electronic devices within the subset of the set of electronic devices while the second electronic communication session is established.

11. A computer system comprising:
a set of electronic devices configured to communicate with each other via a first electronic communication session;
a subset of the set of electronic devices configured to communicate with each other via a second electronic communication session; and
a server in communication with the set and subset of the set of electronic devices, the server configured to:
   identify a set of electronic devices associated with the first electronic communication session;
   upon receiving an instruction from a first electronic device within the set of electronic devices during the first electronic communication session to establish the second electronic communication session:
      automatically select the subset of the set of electronic devices based on an attribute a network used by each electronic device to communicate with the server to establish the first electronic communication session;
      establish the second electronic communication session between the subset of the set of electronic devices;
      reduce a volume of the first electronic communication session outputted on each electronic device within the subset of the set of electronic devices to a predetermined volume level, whereby each electronic device within the subset of the set of electronic devices allows users to listen to audio of the second electronic communication session rather than the first electronic communication session; and
      disable, for the first electronic communication session, a microphone of any electronic device within the subset of the set of electronic devices until termination of the second electronic communication session.

12. The computer system of claim 11, wherein the server is further configured to:
display a transcript of communication within the first electronic communication session on at least one electronic device associated with the subset of the set of electronic devices.

13. The computer system of claim 11, wherein the subset of the set of electronic devices is selected by the first electronic device.

14. The computer system of claim 11, wherein the subset of the set of electronic devices is selected by the server based on a location of each electronic device being within a predetermined proximity to the first electronic device.

15. The computer system of claim 11, wherein the subset of the set of electronic devices is further selected by the server in accordance with an identifier of each electronic device.

16. The computer system of claim 15, wherein the identifier of each electronic device comprises at least one of internet protocol address, media access control address, phone number, and electronic mail address associated with each electronic device.

17. The computer system of claim 11, wherein the first electronic communication session and the second electronic communication session are established using different electronic channels.

18. The computer system of claim 11, wherein the server is further configured to:
retrieve a geographic location identifier of each electronic device within the set of electronic devices; and disable, for the first electronic communication session, the microphone of any electronic device within the subset of the set of electronic devices, that is located within a predetermined proximity to the first electronic device, until a termination of the second electronic communication session.

19. The computer system of claim 18, wherein the geographic location identifier of each electronic device corresponds to a GPS location or a beacon identifier.

20. The computer system of claim 11, wherein the server receives a revised list of electronic device within the subset of the set of electronic devices while the second electronic communication session is established.

* * * * *